United States Patent
Dai et al.

(10) Patent No.: US 11,521,068 B2
(45) Date of Patent: Dec. 6, 2022

(54) METHOD AND SYSTEM FOR NEURAL NETWORK SYNTHESIS

(71) Applicant: The Trustees of Princeton University, Princeton, NJ (US)

(72) Inventors: Xiaoliang Dai, Princeton, NJ (US); Hongxu Yin, Princeton, NJ (US); Niraj K. Jha, Princeton, NJ (US)

(73) Assignee: THE TRUSTEES OF PRINCETON UNIVERSITY, Princeton, NJ (US)

(*) Notice: Subject to any disclaimer, the term of this patent is extended or adjusted under 35 U.S.C. 154(b) by 410 days.

(21) Appl. No.: 16/760,209

(22) PCT Filed: Oct. 25, 2018

(86) PCT No.: PCT/US2018/057485
§ 371 (c)(1),
(2) Date: Apr. 29, 2020

(87) PCT Pub. No.: WO2019/089339
PCT Pub. Date: May 9, 2019

(65) Prior Publication Data
US 2021/0182683 A1 Jun. 17, 2021

Related U.S. Application Data

(60) Provisional application No. 62/580,525, filed on Nov. 2, 2017.

(51) Int. Cl.
*G06N 3/08* (2006.01)
*G06N 3/04* (2006.01)

(52) U.S. Cl.
CPC .............. *G06N 3/082* (2013.01); *G06N 3/04* (2013.01)

(58) Field of Classification Search
CPC ......... G06N 3/082; G06N 3/04; G06N 3/0454
USPC ........................................................ 706/25
See application file for complete search history.

(56) References Cited

U.S. PATENT DOCUMENTS

| | | | | |
|---|---|---|---|---|
| 10,496,922 B1 * | 12/2019 | Dockendorf | ........... | G06N 3/082 |
| 2016/0174902 A1 | 6/2016 | Georgescu et al. | | |
| 2017/0061250 A1 | 3/2017 | Gao et al. | | |

OTHER PUBLICATIONS

European Supplemental Search Report for corresponding EP Application No. 18872050, dated Sep. 20, 2021.
Pereira et al., "A novel constructive algorithm for CANet", 2017 International Joint Conference on Neural Networks (IJCNN), IEEE, pp. 954-961, May 14, 2017.
Islam et al., "A New Adaptive Merging and Growing Algorithm for Designing Artificial Neural Networks", IEEE Transactions on Systems, Man, and Cybernetics, Part B Cybernetics, IEEE Service Center, vol. 39, No. 3, pp. 705-722, Jun. 1, 2009.

(Continued)

*Primary Examiner* — Charlotte M Baker
(74) *Attorney, Agent, or Firm* — Meagher Emanuel Laks Goldberg & Liao, LLP (57) ABSTRACT

According to various embodiments, a method for generating one or more optimal neural network architectures is disclosed. The method includes providing an initial seed neural network architecture and utilizing sequential phases to synthesize the neural network until a desired neural network architecture is reached. The phases include a gradient-based growth phase and a magnitude-based pruning phase.

27 Claims, 11 Drawing Sheets

(56) References Cited

OTHER PUBLICATIONS

Yang et al., "An evolutionary constructive and pruning algorithm for artificial neural networks and its prediction applications", NeuroComputing, vol. 86, pp. 140-149, Jan. 17, 2012.
International Search Report and Written Opinion for PCT/US2018/057485, dated Jan. 11, 2019.
Dai, X. et al.: "NeST: A Neural Network Synthesis Tool Based on a Grow-and-Prune Paradigm", arXiv:1711.02017, Jun. 1, 2018.
Dong, X. et al.: "Learning to Prune Deep Neural Networks via Layer-wise Optimal Brain Surgeon", 31st Conference on Neural Information Processing Systems (NIPS 2017), Long Beach, CA, USA, arXiv:1705.07565v2, Nov. 9, 2017.
Han, S. et al.: "Learning both Weights and Connections for Efficient Neural Networks", arXiv:1506.02626v3, Oct. 30, 2015.

* cited by examiner

Algorithm 1 Neuron growth in the $l^{th}$ layer

Input: $\alpha$ - birth strength, $\beta$ - growth ratio
Denote: $M$ - number of neurons in the $(l+1)^{th}$ layer, $N$ - number of neurons in the $(l-1)^{th}$ layer, $G \in R^{M \times N}$ - bridging gradient matrix, $avg$ - extracts mean value of non-zero elements
Add a neuron in the $l^{th}$ layer, initialize $w^{out} = \vec{0} \in R^M$, $w^{in} = \vec{0} \in R^N$
for $1 \leq m \leq M, 1 \leq n \leq N$ do
$\quad G_{m,n} = \frac{\partial L}{\partial u_m^{l+1}} \times x_n^{l-1}$
end for
$thres = (\beta M N)^{th}$ largest element in $abs(G)$
for $1 \leq m \leq M, 1 \leq n \leq N$ do
$\quad$ if $|G_{m,n}| > thres$ then
$\quad\quad \delta w = \sqrt{|G_{m,n}|} \times rand\{1, -1\}$
$\quad\quad w_m^{out} \leftarrow w_m^{out} + \delta w, w_n^{in} \leftarrow w_n^{in} + \delta w \times sgn(G_{m,n})$
$\quad$ end if
$\quad w^{out} \leftarrow w^{out} \times \alpha \frac{avg(abs(w^{l+1}))}{avg(abs(w^{out}))}, w^{in} \leftarrow w^{in} \times \alpha \frac{avg(abs(w^l))}{avg(abs(w^{in}))}$
end for
Concatenate network weights $W$ with $w^{in}, w^{out}$

*FIG. 5*

Algorithm 2 Partial-area convolution

Input: I - $M$ input images, K - kernel matrix, Msk - feature map mask, $\gamma$ - pruning ratio
Output: Msk, F - $N$ feature maps
Denote: $C \in R^{M \times N \times P \times Q}$ - Depthwise feature map, $\otimes$ - Hadamard (element-wise) multiplication for $1 \leq m \leq M, 1 \leq n < N$ do
    $C_{m,n} = convolve(I_m, K_{m,n})$
end for
$thres = (\gamma MNPQ)^{th}$ largest element in $abs(C)$
for $1 \leq m \leq M, 1 \leq n \leq N, 1 \leq p \leq P, 1 \leq q \leq Q$ do
    if $|C_{m,n,p,q}| < thres$ then
        $Msk_{m,n,p,q} = 0$
    end if
end for
$C \leftarrow C \otimes Msk, F \leftarrow \Sigma_{m=1}^{M} C_m$

METHOD AND SYSTEM FOR NEURAL NETWORK SYNTHESIS

CROSS-REFERENCE TO RELATED APPLICATIONS

This application claims priority to provisional application 62/580,525, filed on Nov. 2, 2017, which is herein incorporated by reference in its entirety.

STATEMENT REGARDING FEDERALLY SPONSORED RESEARCH OR DEVELOPMENT

This invention was made with government support under Grant No. CNS-1617640 awarded by the National Science Foundation. The government has certain rights in the invention.

FIELD OF THE INVENTION

The present invention relates generally to neural networks and, more particularly, to a neural network synthesis tool based on a grow-and-prune paradigm.

BACKGROUND OF THE INVENTION

Over the last decade, deep neural networks (DNNs) have begun to revolutionize myriad research domains, such as computer vision, speech recognition, and machine translation. Their ability to distill intelligence from a dataset through multi-level abstraction can even lead to super-human performance. Thus, DNNs are emerging as a new cornerstone of modern artificial intelligence.

Though critically important, how to efficiently derive an appropriate DNN architecture from large datasets has remained an open problem. Researchers have traditionally derived the DNN architecture by sweeping through its architectural parameters and training the corresponding architecture until the point of diminishing returns in its performance. This suffers from three major problems. First, the widely used back-propagation (BP) algorithm assumes a fixed DNN architecture and only trains weights. Thus, training cannot improve the architecture. Second, a trial-and-error methodology can be inefficient when DNNs get deeper and contain millions of parameters. Third, simply going deeper and larger may lead to large, accurate, but over-parameterized DNNs.

Thus, there is a need for a method and system to efficiently determine an appropriate DNN architecture from large datasets.

SUMMARY OF THE INVENTION

According to various embodiments, a method for generating one or more optimal neural network architectures is disclosed. The method includes providing an initial seed neural network architecture and utilizing sequential phases to synthesize the neural network until a desired neural network architecture is reached. The phases include a gradient-based growth phase and a magnitude-based pruning phase.

According to various embodiments, a neural network synthesis tool (NeST) that automatically generates one or more optimal neural network architectures for a predetermined dataset is disclosed. The NeST includes one or more processes configured to provide an initial seed neural network architecture and utilize sequential phases to synthesize the neural network until a desired neural network architecture is reached. The phases include a gradient-based growth phase and a magnitude-based pruning phase.

According to various embodiments, a non-transitory computer-readable medium having stored thereon a computer program for execution by a processor configured to perform a method for generating one or more optimal neural network architectures is disclosed. The method includes providing an initial seed neural network architecture and utilizing sequential phases to synthesize the neural network until a desired neural network architecture is reached. The phases include a gradient-based growth phase and a magnitude-based pruning phase.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

Deep neural networks (DNNs) have begun to have a pervasive impact on various applications of machine learning. However, the problem of finding an optimal DNN architecture for large applications is challenging. Common approaches go for deeper and larger DNN architectures but may incur substantial redundancy. To address these problems, disclosed herein is a network growth method and system that complements network pruning to learn both weights and compact DNN architectures during training. A DNN synthesis tool (referred to herein as "NeST") is disclosed that automates the generation of compact and accurate DNNs. NeST starts with a randomly initialized sparse network called the seed architecture. It iteratively tunes the architecture with gradient-based growth and magnitude-based pruning of neurons and connections. Experimental results show that NeST yields accurate, yet very compact DNNs, with a wide range of seed architecture selection. For an LeNet-300-100 (LeNet-5) architecture, network parameters were reduced by 70.2× (74.3×) and floating-point operations (FLOPs) by 79.4× (43.7×). For an AlexNet and VGG-16 architectures, network parameters (FLOPs) were reduced by 15.7× (4.6×) and 30.2× (8.6×), respectively. NeST's grow-and-prune paradigm delivers significant additional parameter and FLOPs reduction relative to pruning-only methods.

NeST is configured to train both DNN weights and architectures. NeST is inspired by the learning mechanism of the human brain, where the number of synaptic connections increases upon the birth of a baby, peaks after a few months, and decreases steadily thereafter. NeST starts DNN synthesis from a seed DNN architecture (birth point). It allows the DNN to grow connections and neurons based on gradient information (baby brain) so that the DNN can adapt to the problem at hand. Then, it prunes away insignificant connections and neurons based on magnitude information (adult brain) to avoid redundancy. A combination of network growth and pruning methods enables NeST to generate accurate and compact DNNs.

System Overview

Figure 1:
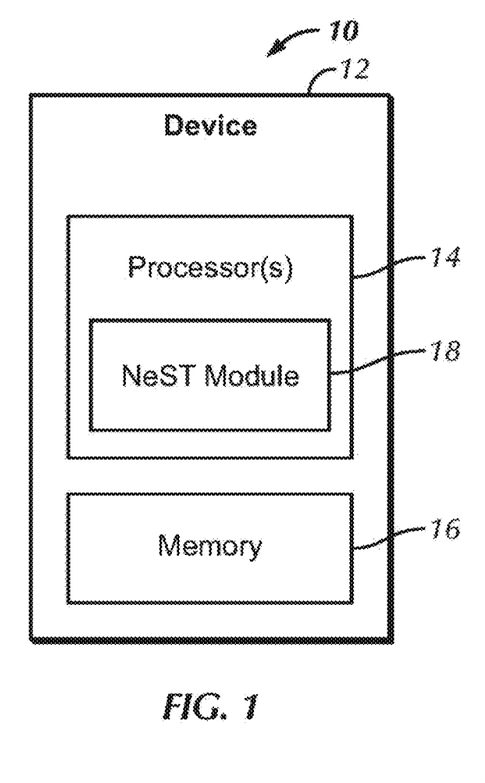
FIG. 1 is a block diagram of a system for NeST according to an embodiment of the present invention.

FIG. 1 illustrates a system 10 configured to implement NeST. The system 10 includes a device 12. The device 12 may be implemented in a variety of configurations including general computing devices such as but not limited to desktop computers, laptop computers, tablets, network appliances, and the like. The device 12 may also be implemented as a mobile device such as but not limited to a mobile phone, smart phone, smart watch, or tablet computer. The device 12 includes one or more processors 14 such as but not limited to a central processing unit (CPU), a graphics processing unit (GPU), or a field programmable gate array (FPGA) for performing specific functions and memory 16 for storing those functions. The processor 14 includes a NeST module 18 for training both DNN weights and architectures. The NeST module 18 methodology will be described in greater detail below.

Synthesis Methodology

According to various embodiments, NeST leverages both constructive and destructive structure adaptation (SA) approaches through a grow-and-prune paradigm. Unless otherwise stated, the notations given in Table 1 are adopted to represent various variables.

TABLE 1

Notations and descriptions

| Label | Description | Label | Description |
|---|---|---|---|
| L | DNN loss function | $W^l$ | weights between $(l-1)^{th}$ and $l^{th}$ layer |
| $x_n^l$ | output value of $n^{th}$ neuron in $l^{th}$ layer | $b^l$ | biases in $l^{th}$ layer |
| $u_m^l$ | input value of $m^{th}$ neuron in $l^{th}$ layer | $R^{d_0 \times d_1 \times d_2}$ | $d_0$ by $d_1$ by $d_2$ matrix with real elements |

Figure 2:
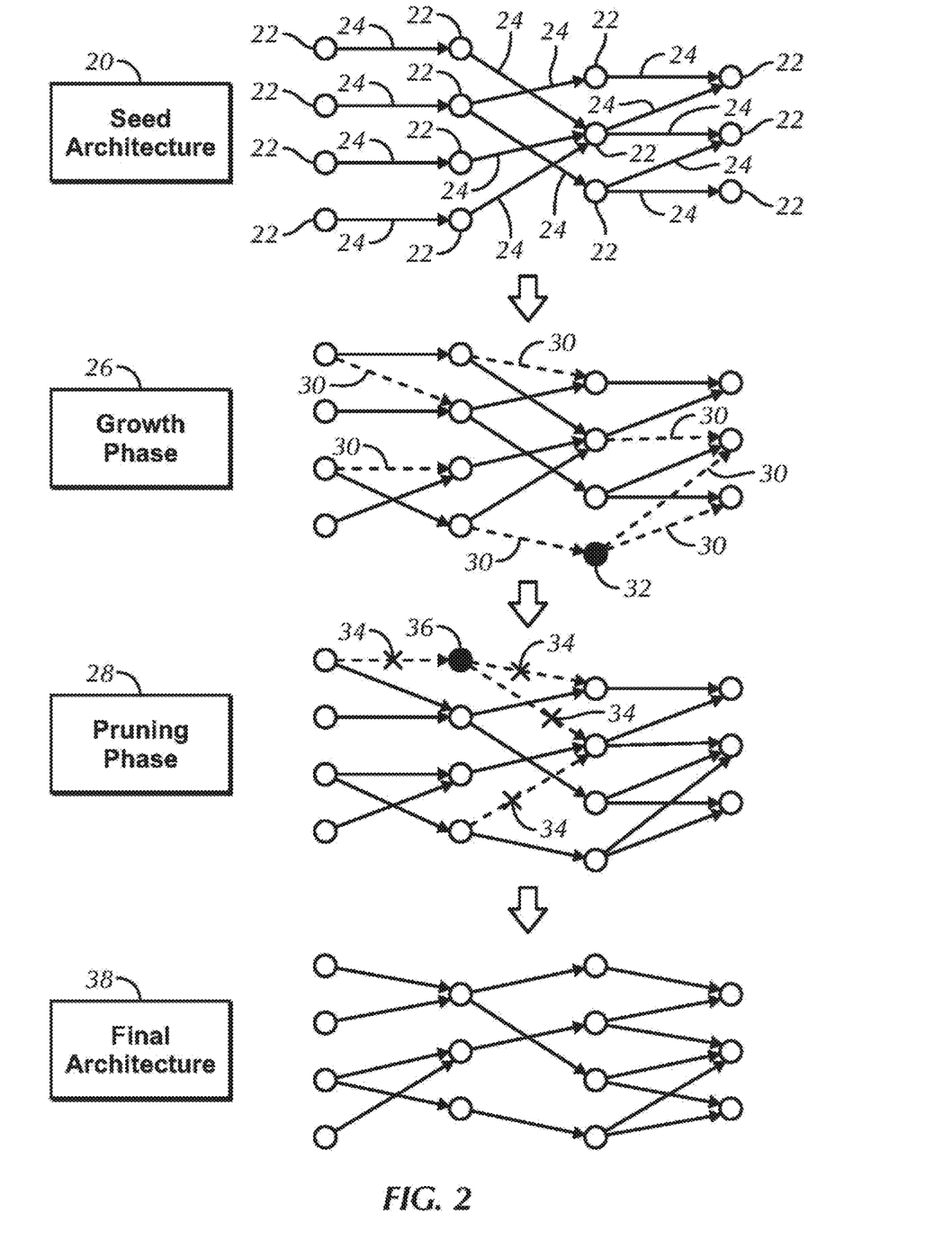
FIG. 2 is a diagram of architecture synthesis flow in NeST according to an embodiment of the present invention.

The NeST approach is illustrated in FIG. 2. Synthesis begins with an initial seed architecture 20, typically initialized as a sparse and partially connected DNN. It is also ensured that all neurons 22 are connected via initial connections 24 in the seed architecture. Then, NeST utilizes two sequential phases to synthesize the DNN: (i) gradient-based growth phase 26, and (ii) magnitude-based pruning phase 28. In the growth phase 26, the gradient information in the architecture space is used to gradually grow new connections 30, neurons 32, and feature maps (not shown) to achieve the desired accuracy. In the pruning phase 28, the DNN inherits the synthesized architecture and weights from the growth phase and iteratively removes redundant connections 34 and neurons 36, based on their magnitudes. Finally, NeST comes to rest at a lightweight DNN model 38 that incurs no accuracy degradation relative to a fully connected model.

Figure 3:
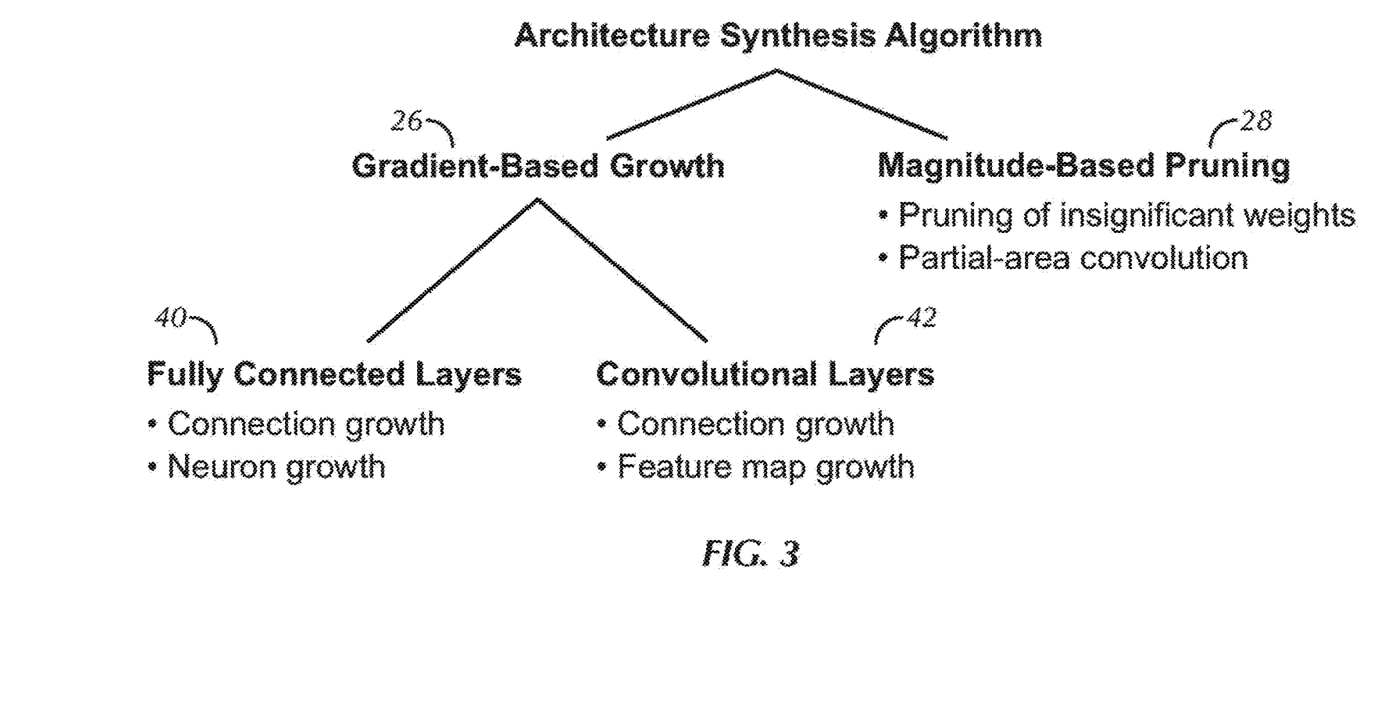
FIG. 3 is a chart of major components of the DNN architecture synthesis methodology in NeST according to an embodiment of the present invention.

A flowchart illustrated in FIG. 3 further shows a summary of the major components of the DNN architecture synthesis in NeST. The architecture synthesis includes gradient-based growth 26 and magnitude-based pruning 28. Gradient-based growth includes two parts: a fully connected layers aspect 40 involving connection growth and neuron growth, and a convolutional layers aspect 42 involving connection growth and feature map growth. Magnitude-based pruning 28 involves pruning of insignificant weights and partial area convolution. Each section will be described in greater detail below.

Gradient-based Growth 26

According to various embodiments, the methodologies in this section are used to grow connections 30, neurons 32, and feature maps (not shown).

The connection growth methodology greedily activates useful but currently dormant connections. This is incorporated into the learning policy: add a connection to if it can quickly reduce the value of loss function L.

Figure 4:
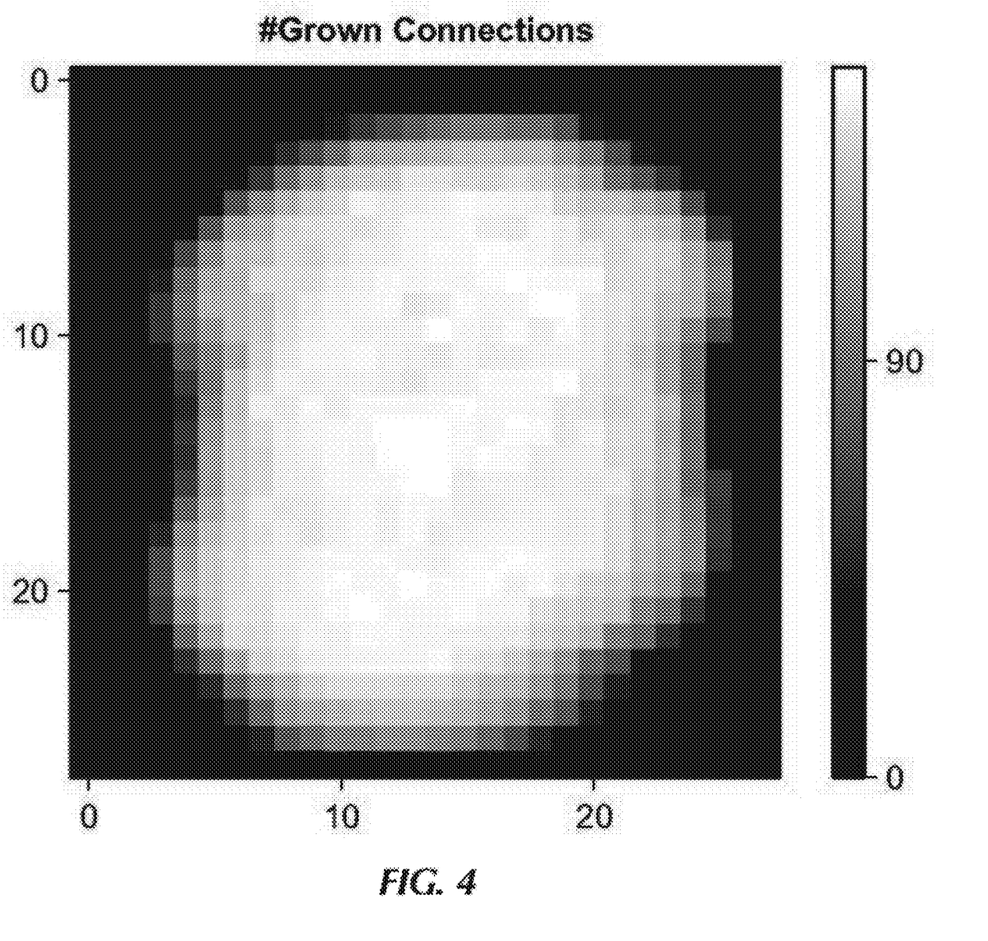
FIG. 4 is a diagram of grown connections from input layer to first layer of LeNet-300-100 according to an embodiment of the present invention.

The DNN seed contains only a small fraction of active connections to propagate gradients. To locate the dormant connections that can reduce L effectively, $\partial L/\partial \omega$ is evaluated for all the dormant connections $\omega$ (computed either using the whole training set or a large batch). The above policy activates dormant connections if they the most efficient at reducing L. This can also assist with avoiding local minima and achieving higher accuracy. To illustrate this policy, the connections grown from the input to the first layer of LeNet-300-100 (for the MNIST dataset) are plotted in FIG. 4. The image center has a much higher grown density than the margins, consistent with the fact that the MNIST digits are centered.

From a neuroscience perspective, the connection growth methodology coincides with the Hebbian theory: Neurons that fire together wire together. The stimulation magnitude of the $m^{th}$ presynaptic neuron in the $(l+1)^{th}$ layer and the $n^{th}$ postsynaptic neuron in the $l^{th}$ layer is defined as $\partial L/\partial u_m^{l+1}$ and $x_n^l$, respectively. The connections activated based on Hebbian theory would have a strong correlation between presynaptic and postsynaptic cells, thus a large value of $|\partial L/\partial u_m^{l+1}|x_n^l|$. This is also the magnitude of the gradient of L with respect to $\omega$ ($\omega$ is the weight that connects $u_m^{l+1}$ and $x_n^l$:

$$|\partial L/\partial \omega| = |(\partial L/\partial u_m^{l+1})x_n^l| \quad (1)$$

The neuron growth methodology includes two steps: (i) connection establishment and (ii) weight initialization. The neuron growth policy is as follows:

In the $l^{th}$ layer, add a new neuron as a shared intermediate node between existing neuron pairs that have high postsynaptic (x) and presynaptic ($\partial L/\partial u$) neuron correlations (each pair contains one neuron from the $(l-1)^{th}$ layer and the other from the $(l+1)^{th}$ layer). Initialize weights based on batch gradients to reduce the value of L.

Figure 5:
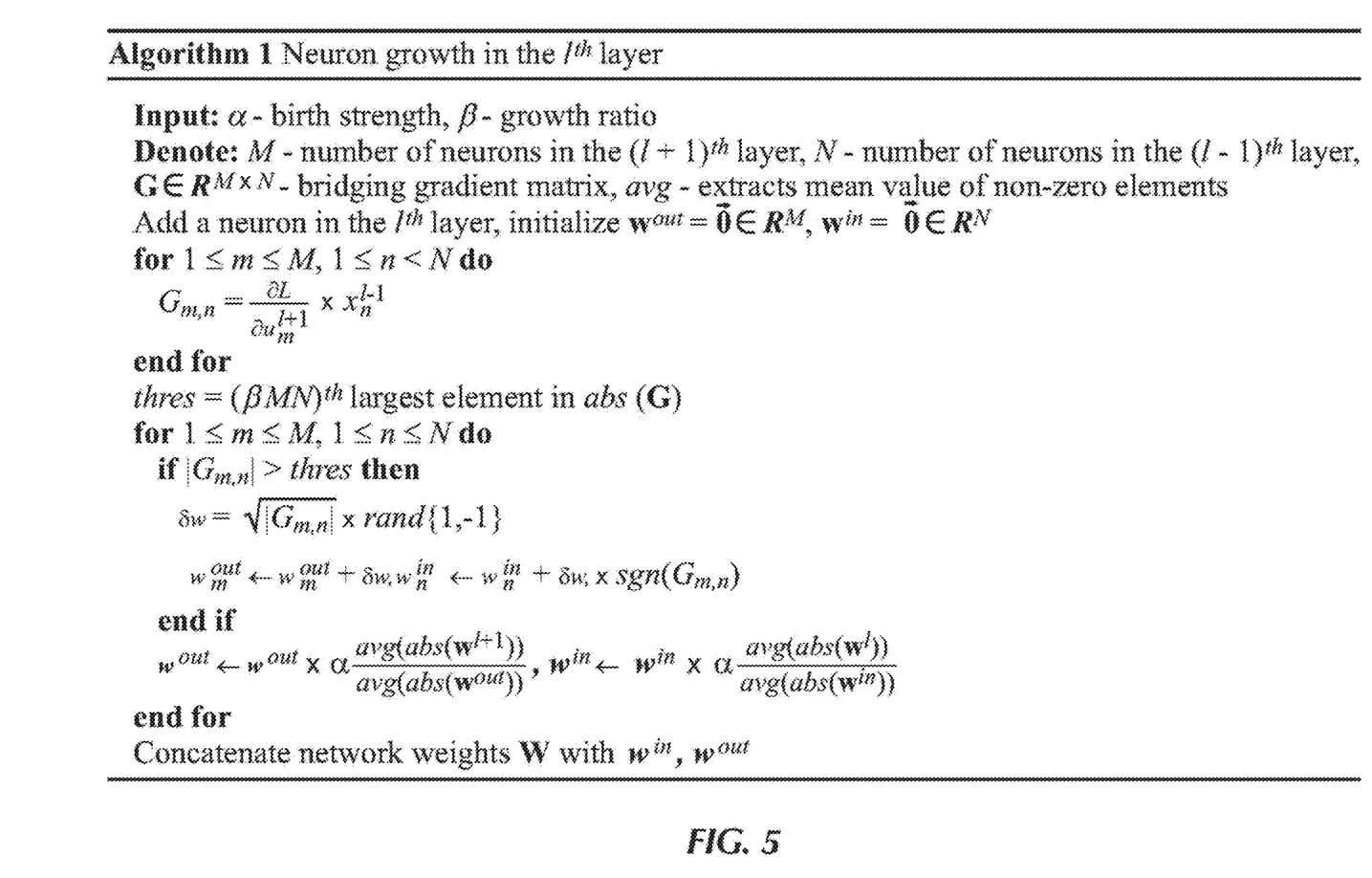
FIG. 5 is a methodology for neuron growth according to an embodiment of the present invention.

The algorithm in FIG. 5 incorporates this policy and illustrates the neuron growth iterations in detail. Before adding a neuron to the $l^{th}$ layer, the bridging gradient is evaluated between the neurons at the previous $(l-1)^{th}$ and subsequent $(l+1)^{th}$ layers. The top $\beta \times 100\%$ ($\beta$ is the growth ratio) correlated neuron pairs are connected through a new neuron in the $l^{th}$ layer. The weights are initialized based on the bridging gradient to enable gradient descent, thus decreasing the value of L.

A square root rule is implemented for weight initialization to imitate a BP update on the bridging connection $\omega_b$, which connects $x_n^{l-1}$ and $u_m^{l+1}$. The BP update lead to a change in $u_m^{l+1}$:

$$|\Delta u_m^{l+1}|_{b.p.} = |x_n^{l-1} \times \delta \omega_b| = \eta |x_n^{l-1} \times G_{m,n}| \quad (2)$$

where $\eta$ is the learning rate. In the algorithm in FIG. 5, when a newly added neuron (in the $l^{th}$ layer) is connected with $x_n^{l-1}$ and $u_m^{l+1}$, their weights are initialized to the square root of the magnitude of the bridging gradient:

$$|\delta \omega_n^{in}| = |\delta \omega_m^{out}| = \sqrt{|G_{m,n}|} \quad (3)$$

where $\delta \omega_n^{in}$ ($\delta \omega_m^{out}$) is the initialized value of the weight that connects the newly added neuron with $x_n^{l-1}$ ($u_m^{l+1}$). The weight initialization rule leads to a change in $u_m^{l+1}$:

$$|\Delta u_m^{l+1}| = |f(x_n^{l-1} \times \delta \omega_n^{in}) \times \delta \omega_m^{out}| \quad (4)$$

where f is the neuron activation function. Suppose tan h is the activation function.
Then:

$$f(x) = \tan h(x) \approx x, \text{ if } x \ll 1 \quad (5)$$

Since $\delta \omega_n^{in}$ and $\delta \omega_m^{out}$ are typically very small, the approximation in Eq. (5) leads to the following:

$$|\Delta u_m^{l+1}| \approx |x_n^{l-1} \times \delta \omega_n^{in} \times \delta \omega_m^{out}| = \frac{1}{\eta} \times |u_m^{l+1}|_{b.p.} \quad (6)$$

This is linearly proportional to the effect of a BP update. Thus, the weight initialization mathematically imitates a BP update. Though the algorithm was illustrated with the tan h activation function, the weight initialization rule works equally well with other activation functions, such as but not limited to rectified linear unit (ReLU) and leaky rectified linear unit (Leaky ReLU).

A birth strength factor $\alpha$ is used to strengthen the connections of a newly grown neuron. This prevents these connections from becoming too weak to survive the pruning phase. Specifically, after square root rule-based weight initialization, the newly added weights are scaled up by:

$$w^{out} \leftarrow \alpha w^{out} \times \frac{avg(abs((W^{l+1}))}{avg(abs(e^{out}))}, \; w^{in} \leftarrow \alpha w^{in} \times \frac{avg(abs(W^l))}{avg(abs(w^{in}))} \quad (7)$$

where avg is an operation that extracts the mean value of all non-zero elements. This strengthens new weights. In practice, $\alpha > 0.3$ was found to be an appropriate range.

Convolutional layers are related to the connection growth methodology. However, instead of neuron growth, a unique feature map growth methodology is used for convolutional layers. In a convolutional layer, input images are convolved with kernels to generate feature maps. Thus, to add a feature map, the corresponding set of kernels needs to be initialized. The feature map growth policy is summarized as follows: to add a new feature map to the convolutional layers, randomly generate sets of kernels, and pick the set of kernels that reduces L the most.

During experimentation, it is observed that the percentage reduction in L for the above policy is approximately twice as in the case of the naive approach that initializes the new kernels with random values.

Magnitude-Based Pruning 28

According to various embodiments, insignificant connections and neurons are pruned away based on the magnitude of weights and outputs. The policy is summarized as follows: remove a connection (or neuron) if the magnitude of the weight (or neuron output) is smaller than a pre-defined threshold. Two variants of this policy are explained below: pruning of insignificant weights and partial-area convolution.

Magnitude-based pruning can successfully cut down memory and computational costs. This approach is extended to incorporate a batch normalization technique. Such a technique can reduce the internal covariate shift by normalizing layer inputs and improve training speed and behavior. Consider the $l^{th}$ batch normalization layer:

$$u^l = [(W^l x^{l-1} + b^l) - E] \oslash V = W_*^l x + b_*^l \quad (8)$$

where E and V are batch normalization terms, and $\oslash$ depicts the Hadamard (element-wise) division operator. Effective weights $W_*^l$ and effective biases $b_*^l$ are defined as:

$$W_*^l = W^l \oslash V, \; b_*^l = (b^l - E) \oslash V \quad (9)$$

Connections with small effective weights are treated as insignificant. Pruning of insignificant weights is an iterative process. In each iteration, the most insignificant weights (e.g., top 1%) are only pruned for each layer, and then the whole DNN is retrained to recover its performance.

In common convolutional neural networks (CNNs), the convolutional layers typically consume about 5% of the parameters, but contribute to about 90-95% of the total FLOPs. In a convolutional layer, kernels shift and convolve with the entire input image. This process incurs redundancy, since not the whole input image is of interest to a particular kernel. One methodology is to prune all connections from a not-of-interest input image to a particular kernel. This method reduces FLOPs but incurs performance degradation. Instead of discarding an entire image, the proposed partial-area convolution methodology allows kernels to convolve with the image areas that are of interest. Such an area is referred to as area-of-interest. Connections are pruned to other image areas.

Figure 7:
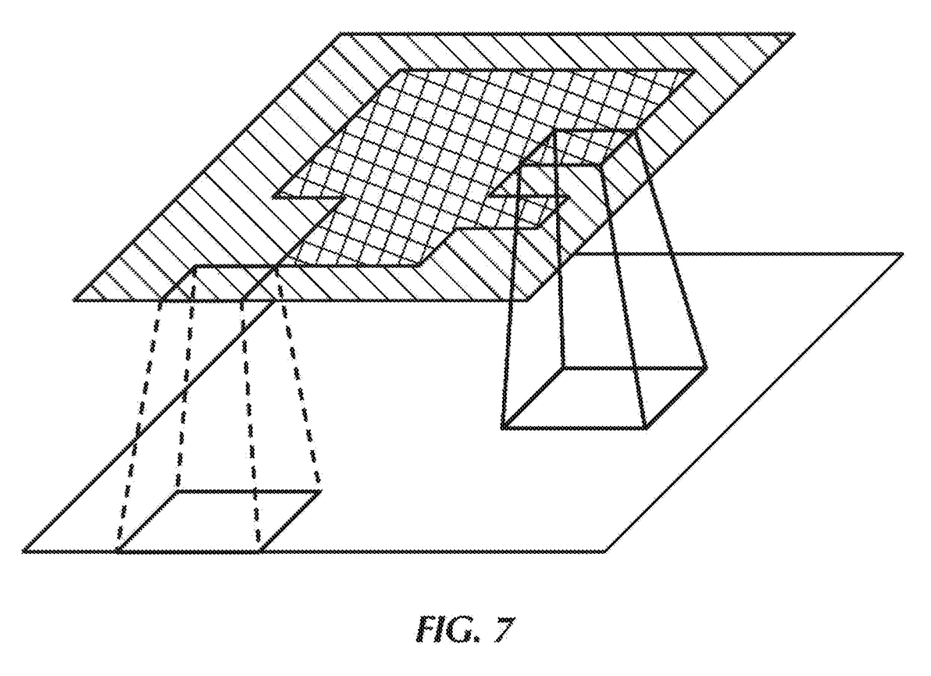
FIG. 7 is a diagram of pruned connections and remaining connections in partial area convolution according to an embodiment of the present invention.

This process is illustrated in FIG. 7. The cross shaded area in the center depicts area-of-interest, whereas the slant shaded area around the cross shaded area depicts parts that are not of interest. Thus, solid line connections are kept, whereas dashed line connections are pruned away.

Figure 6:
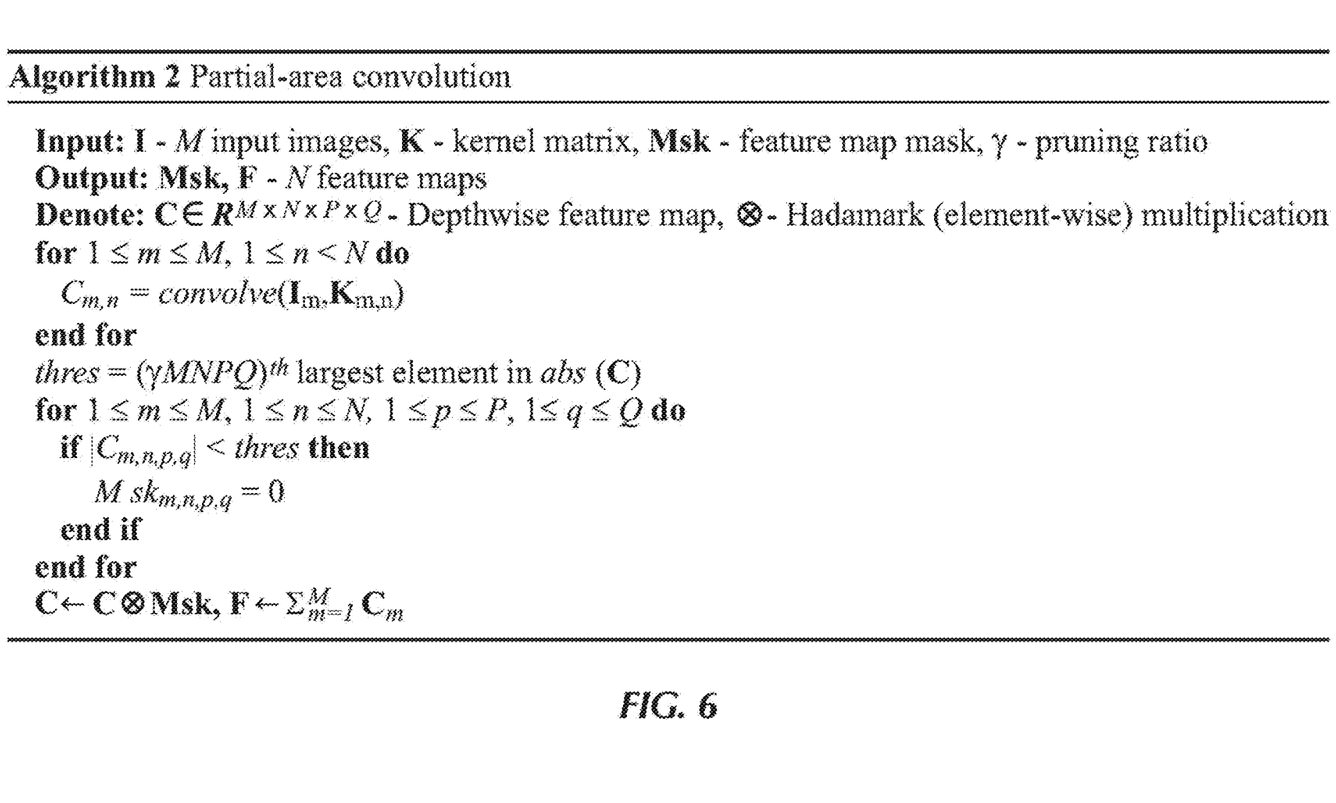
FIG. 6 is a methodology for partial area convolution according to an embodiment of the present invention.

Partial-area convolution pruning is an iterative process. One such iteration is presented in the algorithm in FIG. 6. M input images are first convolved with M×N convolution kernels and M×N feature maps are generated, which are stored in a four-dimensional feature map matrix C. The pruning threshold thres is set to the $(100\gamma)^{th}$ percentile of all elements in abs(C), where γ is the pruning ratio, typically but not limited to 1%. The elements whose values are below this threshold are marked as insignificant, and their input connections are pruned away. The whole DNN is retrained after each pruning iteration. A mask Msk may be utilized to disregard the pruned convolution area.

Figure 8:
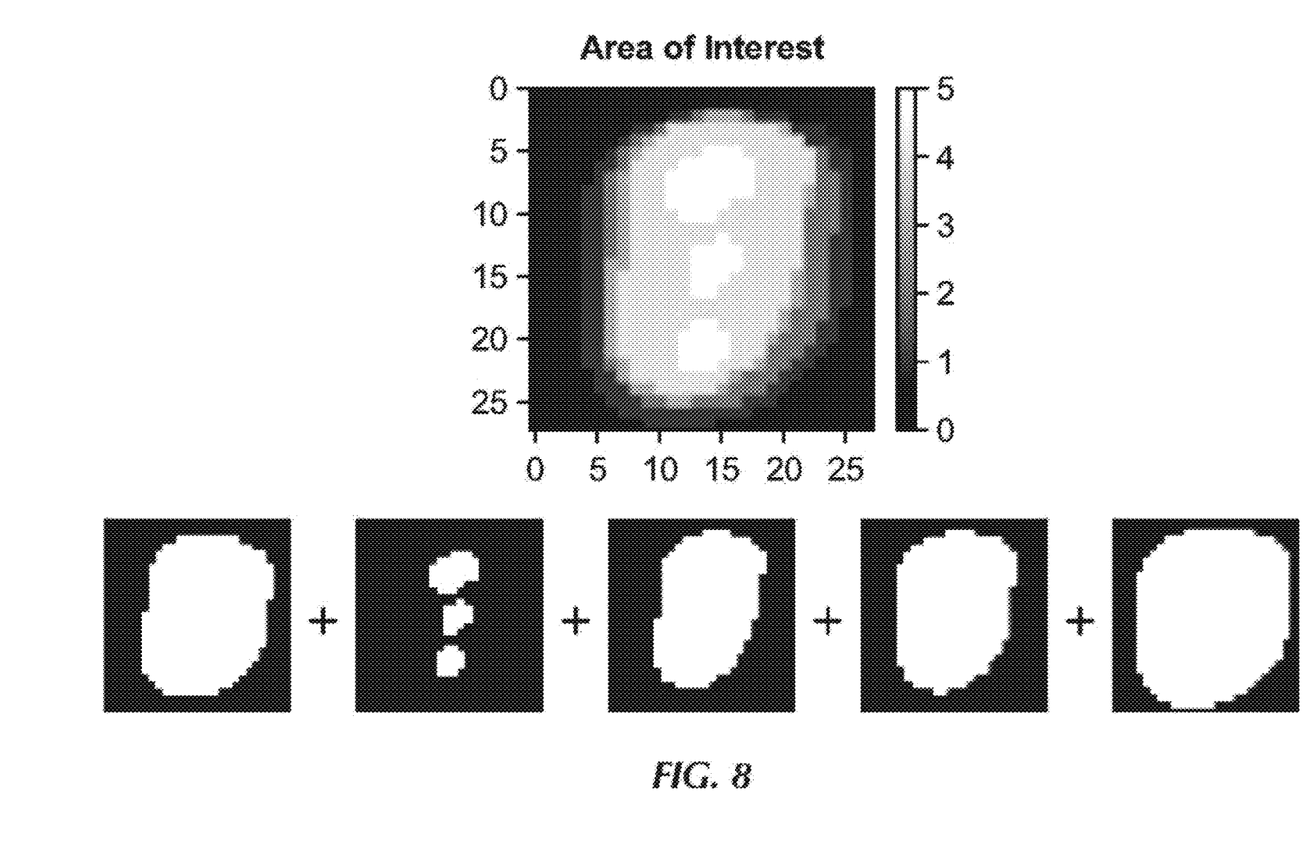
FIG. 8 is a diagram of area-of-interests for five different kernels in first layer of LeNet-5 according to an embodiment of the present invention.

Partial-area convolution enables additional FLOPs reduction without any performance degradation. For example, FLOPs in LeNet-5 can be reduced by 2.09× when applied to MNIST. Compared to the conventional CNNs that force a fixed square-shaped area-of-interest on all kernels, each kernel is allowed to self-explore the preferred shape of its area-of-interest. FIG. 8 shows the area-of-interest found by the layer-1 kernels in LeNet-5 when applied to MNIST. Significant overlaps are observed in the image central area, which most kernels are interested in.

Evaluation of an Exemplary Embodiment of NeST

NeST was implemented using Tensorflow and PyTorch on Nvidia GTX 1060 and Tesla P100 GPUs. NeST was used to synthesize compact DNNs for the MNIST and ImageNet datasets. DNN seed architectures were selected based on clues (e.g., depth, kernel size, etc.) from the existing LeNets, AlexNet, and VGG-16 architectures, respectively. From this implementation, NeST exhibited two major advantages.

(1) Wide seed range: NeST yields high-performance DNNs with a wide range of seed architectures. Its ability to start from a wide range of seed architectures alleviates reliance on human-defined architectures, and offers more freedom to DNN designers.

(2) Drastic redundancy removal: NeST-generated DNNs are very compact. Compared to the DNN architectures generated with pruning-only methods, DNNs generated through the grow-and-prune paradigm have much fewer parameters and require much fewer FLOPs.

For LeNets on MNIST, the seed architectures were derived from the original LeNet-300-100 and LeNet-5 networks. LeNet-300-100 is a multi-layer perceptron with two hidden layers. LeNet-5 is a CNN with two convolutional layers and three fully connected layers. The affine-distorted MNIST dataset is used, on which LeNet-300-100 (LeNet-5) can achieve an error rate of 1.3% (0.8%).

For the growth phase, first, nine (four) seed architectures were derived for LeNet-300-100 (LeNet-5). These seeds contain fewer neurons and connections per layer than the original LeNets. The number of neurons in each layer is the product of a ratio r and the corresponding number in the original LeNets (e.g., the seed architecture for LeNet-300-100 becomes LeNet-120-40 if r=0.4). Only 10% of all possible connections in the seed architecture are randomly initialized. Also, it is ensured that all neurons in the network are connected.

First, r was swept for LeNet-300-100 (LeNet-5) from 0.2 (0.5) to 1.0 (1.0) with a step-size of 0.1 (0.17), and then the DNN architectures were grown from these seeds. The impact of these seeds was studied on the GPU time for growth and post-growth DNN sizes under the same target accuracy (this accuracy is typically a reference value for the architecture). The results for LeNets are summarized in FIG. 9. There were two interesting findings for the growth phase.

(1) Smaller seed architectures often lead to smaller post-growth DNN sizes, but at the expense of a higher growth time. Smaller seeds and thus smaller post-growth DNN sizes are better, since they also lead to smaller final DNN sizes.

Figure 9A:
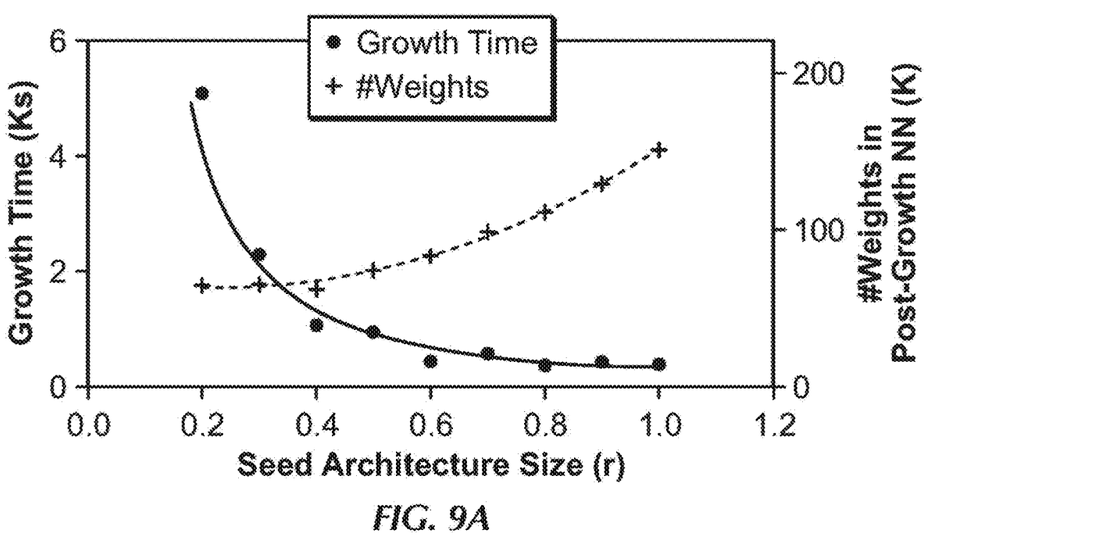
FIG. 9 is a graph of growth time vs. post-growth DNN size trade-off for various seed architectures for LeNet-300-100 and LeNet-5 according to an embodiment of the present invention.
Figure 9B:
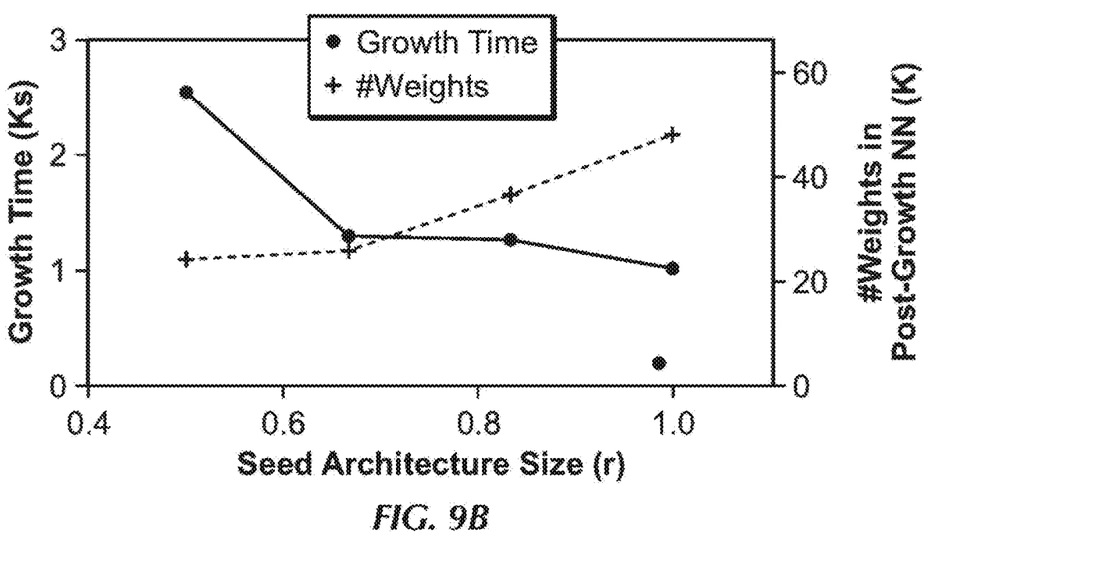

(2) When the post-growth DNN size saturates due to the full exploitation of the synthesis freedom for a target accuracy, a smaller seed is no longer beneficial, as evident from the flat left ends of the dashed curves in FIG. 9.

Figure 10A:
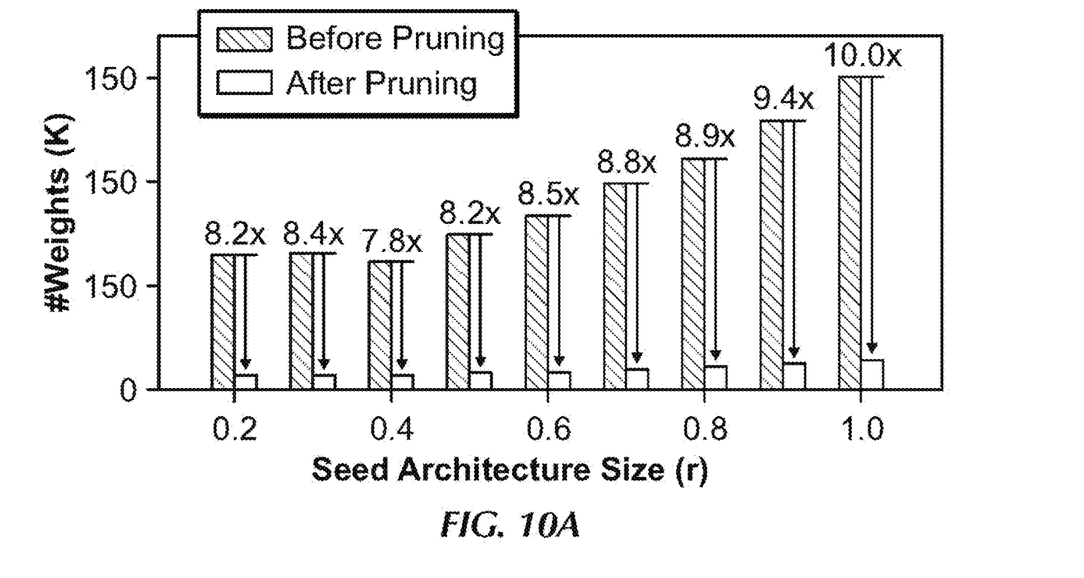
FIG. 10 is a graph of compression ratio and final DNN size for different LeNet-300-100 and LeNet-5 seed architectures according to an embodiment of the present invention.
Figure 10B:
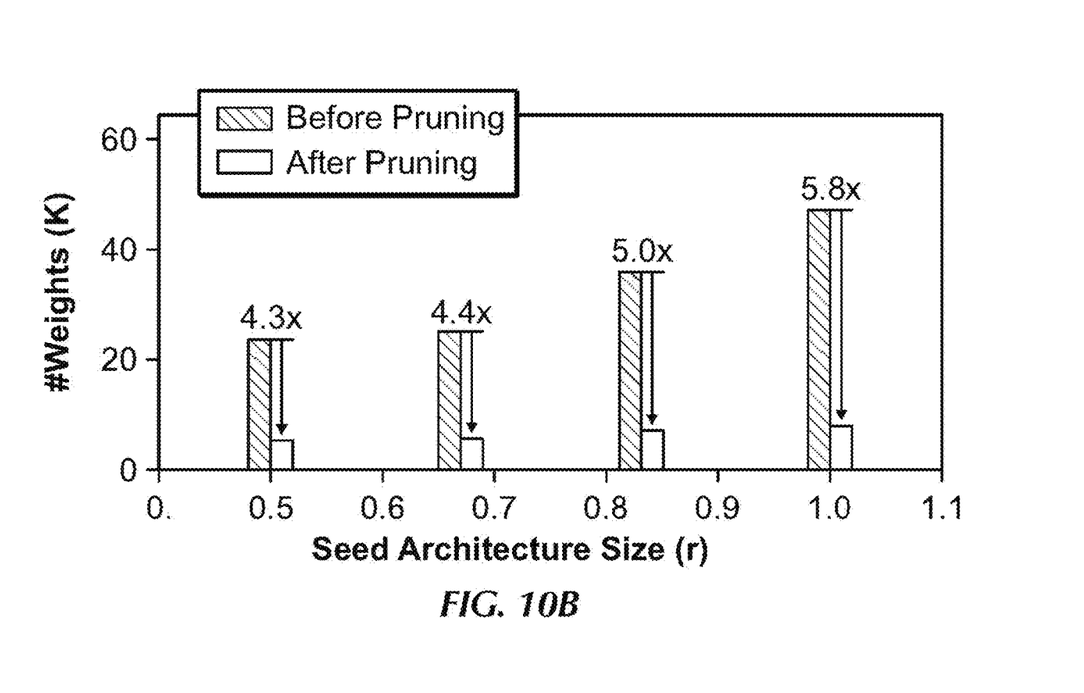

For the pruning phase, next, the post-growth LeNet DNNs are pruned to remove their redundant neurons/connections. It is shown the post-pruning DNN sizes and compression ratios for LeNet-300-100 and LeNet-5 for the different seeds in FIG. 10. There were two major observations for the pruning phase.

(1) The larger the pre-pruning DNN, the larger is its compression ratio. This is because larger pre-pruning DNNs have a larger number of weights and thus also higher redundancy.

(2) The larger the pre-pruning DNN, the larger is its post-pruning DNN. Thus, to synthesize a more compact DNN, one should choose a smaller seed architecture within an appropriate range.

The results are compared against related results in the below Table 2. The results for the embodiment disclosed herein outperform other reference models from various design perspectives. Without any loss of accuracy, the number of connections and FLOPs were reduced of LeNet-300-100 (LeNet-5) by 70.2× (74.3×) and 79.4× (43.7×), respectively, relative to the baseline Caffe model.

TABLE 2

Different inference models for MNIST

| Model | Method | Error | #Param | FLOPs |
| --- | --- | --- | --- | --- |
| RBF network [7] | — | 3.60% | 794K | 1588K |
| Polynomial classifier [7] | — | 3.30% | 40K | 78K |
| K-nearest neighbors [7] | — | 3.09% | 47K | 94M |
| SVMs (reduced set) [35] | — | 1.10% | 650K | 1300K |
| Caffe model (LeNet-300-100) [36] | — | 1.60% | 266K | 532K |
| LWS (LeNet-300-100) [22] | Prune | 1.96% | 4K | 8K |
| Net pruning (LeNet-300-100) [5] | Prune | 1.59% | 22K | 43K |
| Our LeNet-300-100: compact | Grow + Prune | 1.58% | 3.8K | 6.7K |
| Our LeNet-300-100: accurate | Grow + Prune | 1.29% | 7.8K | 14.9K |
| Caffe model (LeNet-5) [36] | — | 0.80% | 431K | 4586K |
| LWS (LeNet-5) [22] | Prune | 1.66% | 4K | 199K |
| Net pruning (LeNet-5) [5] | Prune | 0.77% | 35K | 734K |
| Our LeNet-5 | Grow + Prune | 0.77% | 5.8K | 105K |

For the AlexNet and VGG-16 on ImageNet, NeST is used to synthesize DNNs for the ILSVRC 2012 image classification dataset. A slim and sparse seed architecture is initialized base on the AlexNet and VGG-16. For this embodiment, the seed architecture for AlexNet contains only 60, 140, 240, 210, and 160 feature maps in the five convolutional layers, and 3200, 1600, and 1000 neurons in the fully connected layers. The seed architecture for VGG-16 uses r=0.75 for the first 13 convolutional layers, and has 3200, 1600, and 1000 neurons in the fully connected layers. 30% of all the possible connections are randomly activated for both seed architectures.

Table 3 below compares the model synthesized by NeST with various AlexNet and VGG-16 based inference models. The baselines here are the AlexNet Caffe model (42.78% top-1 and 19.73% top-5 error rate) and VGG-16 PyTorch model (28.41% top-1 and 9.62% top-5 error rate). The grow-and-prune synthesis paradigm disclosed herein outperforms the pruning-only methods listed in Table 3. This may be explained by the observation that pruning methods potentially inherit a certain amount of redundancy associated with the original large DNNs. Network growth can alleviate this phenomenon.

Note that the current mask-based implementation of growth and pruning incurs a temporal memory overhead during training. If the model becomes deeper, as in the case of ResNet or DenseNet, using masks to grow and prune connections, neurons, and/or feature maps may not be economical due to this temporal training memory overhead.

through gradient-based growth and magnitude-based pruning, and finally arrives at a compact DNN with high accuracy. For LeNet-300-100 (LeNet-5) on MNIST, the number of network parameters were reduced by 70.2× (74.3×) and FLOPs by 79.4× (43.7×). For AlexNet and VGG-16 on ImageNet, the network parameters (FLOPs) were reduced by 15.7× (4.6×) and 30.2× (8.6×), respectively.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

TABLE 3

Different AlexNet and VGG-16 based inference models for ImageNet

| Model | Method | ΔTop-1 err. | ΔTop-5 err. | #Param (M) | FLOPs (B) |
|---|---|---|---|---|---|
| Baseline AlexNet [37] | — | 0.0% | 0.0% | 61 (1.0×) | 1.5 (1.0×) |
| Data-free pruning [38] | Prune | +1.62% | — | 39.6 (1.5×) | 1.0 (1.5×) |
| Fastfood-16-AD [39] | — | +0.12% | — | 16.4 (3.7×) | 1.4 (1.1×) |
| Memory-bounded [40] | — | +1.62% | — | 15.2 (4.0×) | — |
| SVD [41] | — | +1.24% | +0.83% | 11.9 (5.1×) | — |
| LWS (AlexNet) [22] | Prune | +0.33% | +0.28% | 6.7 (9.1×) | 0.5 (3.0×) |
| Net pruning (AlexNet) [5] | Prune | −0.01% | −0.06% | 6.7 (9.1×) | 0.5 (3.0×) |
| Our AlexNet | Grow + Prune | −0.02% | −0.06% | 3.9 (15.7×) | 0.33 (4.6×) |
| Baseline VGG-16 [42] | — | 0.0% | 0.0% | 138 (1.0×) | 30.9 (1.0×) |
| LWS (VGG-16) [22] | Prune | +3.61% | +1.35% | 10.3 (13.3×) | 6.5 (4.8×) |
| Net pruning (VGG-16) [5] | Prune | +2.93% | +1.26% | 10.3 (13.3×) | 6.5 (4.8×) |
| Our VGG-16: accurate | Grow + Prune | −0.35% | −0.31% | 9.9 (13.9×) | 6.3 (4.9×)* |
| Our VGG-16: compact | Grow + Prune | +2.31% | +0.98% | 4.6 (30.2×) | 3.6 (8.6×)* |

*Currently without partial-area convolution due to GPU memory limits

CONCLUSION

The synthesis methodology disclosed herein incorporates three inspirations from the human brain.

Figure 11:
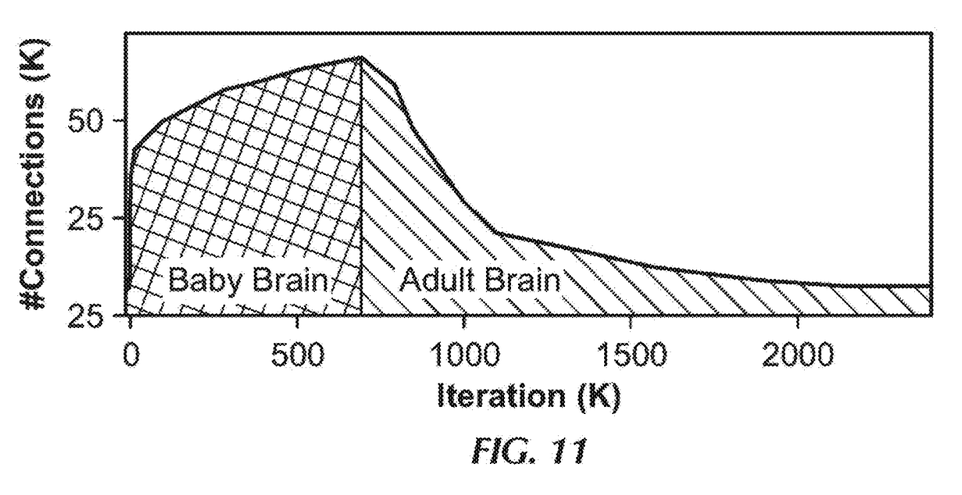
FIG. 11 is a graph of connections vs. synthesis iteration for LeNet-300-100 according to an embodiment of the present invention.

First, the number of synaptic connections in a human brain varies at different human ages. It rapidly increases upon the baby's birth, peaks after a few months, and decreases steadily thereafter. A DNN experiences a very similar learning process in NeST, as shown in FIG. 11. This curve shares a very similar pattern to the evolution of the number of synapses in the human brain.

Second, most learning processes in a human brain result from rewiring of synapses between neurons. The human brain grows and prunes away a large amount (up to 40%) of synaptic connections every day. NeST wakes up new connections, thus effectively rewiring more neurons pairs in the learning process. Thus, it mimics the "learning through rewiring" mechanism of human brains.

Third, only a small fraction of neurons are active at any given time in human brains. This mechanism enables the human brain to operate at an ultra-low power (20 Watts). However, fully connected DNNs contain a substantial amount of insignificant neuron responses per inference. To address this problem, a magnitude-based pruning methodology is included in NeST to remove the redundancy, thus achieving sparsity and compactness. This leads to huge storage and computation reductions.

As such disclosed herein is a synthesis tool, NeST, to synthesize compact yet accurate DNNs. NeST starts from a sparse seed architecture, adaptively adjusts the architecture

What is claimed is:

1. A method for generating one or more optimal neural network architectures, comprising:
    providing an initial seed neural network architecture; and
    utilizing sequential phases to synthesize the neural network until a desired neural network architecture is reached, the phases comprising a gradient-based growth phase and a magnitude-based pruning phase;
    the gradient-based growth phase comprising adding one or more connections whose gradient magnitudes are larger than a predefined percentile of gradient magnitudes based on a growth ratio;
    the magnitude-based pruning phase comprising removing one or more connections whose magnitudes are smaller than a predefined percentile of magnitudes based on a pruning ratio.

2. The method of claim 1, wherein the gradient-based growth phase and magnitude-based pruning phase are iterative.

3. The method of claim 1, wherein the gradient-based growth phase comprises a fully connected layers aspect comprising connection growth and neuron growth.

4. The method of claim 3, wherein the connection growth aspect comprises a policy to add a connection if the connection can reduce a value of a loss function.

5. The method of claim 3, wherein the neuron growth aspect comprises a policy to add a new neuron as a shared intermediate node between existing neuron pairs that have high postsynaptic and presynaptic neuron correlations and to initialize weights based on batch gradients to reduce a value of a loss function.

6. The method of claim 1, wherein the gradient-based growth phase comprises a convolutional layers aspect comprising connection growth and feature map growth.

7. The method of claim 6, wherein the feature map growth aspect comprises a policy to add a new feature map to convolutional layers, randomly generate sets of kernels, and pick the set of kernels that reduces a loss function the most.

8. The method of claim 1, wherein the magnitude-based pruning phase comprises pruning of insignificant weights and partial-area convolution.

9. The method of claim 8, wherein the pruning of insignificant weights and partial-area convolution comprises a policy to remove a connection or neuron if a magnitude of a weight or neuron output is smaller than a predefined threshold.

10. A neural network synthesis tool (NeST) that automatically generates one or more optimal neural network architectures for a predetermined dataset, the NeST comprising one or more processors configured to:
provide an initial seed neural network architecture; and
utilize sequential phases to synthesize the neural network until a desired neural network architecture is reached, the phases comprising a gradient-based growth phase and a magnitude-based pruning phase;
the gradient-based growth phase comprising a policy to add one or more connections whose gradient magnitudes are larger than a predefined percentile of gradient magnitudes based on a growth ratio;
the magnitude-based pruning phase comprising a policy to remove one or more connections whose magnitudes are smaller than a predefined percentile of magnitudes based on a pruning ratio.

11. The NeST of claim 10, wherein the gradient-based growth phase and magnitude-based pruning phase are iterative.

12. The NeST of claim 10, wherein the gradient-based growth phase comprises a fully connected layers aspect comprising connection growth and neuron growth.

13. The NeST of claim 12, wherein the connection growth aspect comprises a policy to add a connection if the connection can reduce a value of a loss function.

14. The NeST of claim 12, wherein the neuron growth aspect comprises a policy to add a new neuron as a shared intermediate node between existing neuron pairs that have high postsynaptic and presynaptic neuron correlations and to initialize weights based on batch gradients to reduce a value of a loss function.

15. The NeST of claim 10, wherein the gradient-based growth phase comprises a convolutional layers aspect comprising connection growth and feature map growth.

16. The NeST of claim 15, wherein the feature map growth aspect comprises a policy to add a new feature map to convolutional layers, randomly generate sets of kernels, and pick the set of kernels that reduces a loss function the most.

17. The NeST of claim 10, wherein the magnitude-based pruning phase comprises pruning of insignificant weights and partial-area convolution.

18. The NeST of claim 17, wherein the pruning of insignificant weights and partial-area convolution comprises a policy to remove a connection or neuron if a magnitude of a weight or neuron output is smaller than a predefined threshold.

19. A non-transitory computer-readable medium having stored thereon a computer program for execution by a processor configured to perform a method for generating one or more optimal neural network architectures, the method comprising:
providing an initial seed neural network architecture; and
utilizing sequential phases to synthesize the neural network until a desired neural network architecture is reached, the phases comprising a gradient-based growth phase and a magnitude-based pruning phase;
the gradient-based growth phase comprising adding one or more connections whose gradient magnitudes are larger than a predefined percentile of gradient magnitudes based on a growth ratio;
the magnitude-based pruning phase comprising removing one or more connections whose magnitudes are smaller than a predefined percentile of magnitudes based on a pruning ratio.

20. The computer-readable medium of claim 19, wherein the gradient-based growth phase and magnitude-based pruning phase are iterative.

21. The computer-readable medium of claim 19, wherein the gradient-based growth phase comprises a fully connected layers aspect comprising connection growth and neuron growth.

22. The computer-readable medium of claim 21, wherein the connection growth aspect comprises a policy to add a connection if the connection can reduce a value of a loss function.

23. The computer-readable medium of claim 21, wherein the neuron growth aspect comprises a policy to add a new neuron as a shared intermediate node between existing neuron pairs that have high postsynaptic and presynaptic neuron correlations and to initialize weights based on batch gradients to reduce a value of a loss function.

24. The computer-readable medium of claim 19, wherein the gradient-based growth phase comprises a convolutional layers aspect comprising connection growth and feature map growth.

25. The computer-readable medium of claim 24, wherein the feature map growth aspect comprises a policy to add a new feature map to convolutional layers, randomly generate sets of kernels, and pick the set of kernels that reduces a loss function the most.

26. The computer-readable medium of claim 19, wherein the magnitude-based pruning phase comprises pruning of insignificant weights and partial-area convolution.

27. The computer-readable medium of claim 26, wherein the pruning of insignificant weights and partial-area convolution comprises a policy to remove a connection or neuron if a magnitude of a weight or neuron output is smaller than a predefined threshold.

* * * * *